United States Patent [19]
Schaberg et al.

[11] 3,765,256
[45] Oct. 16, 1973

[54] LOW RANGE HIGH OVERLOAD DIFFERENTIAL PRESSURE TRANSDUCER

[75] Inventors: Richard R. Schaberg, Ventura; Peter R. Perino; Ronald P. Helin, both of Camarillo, all of Calif.

[73] Assignee: Stathen Instruments, Inc., Oxnard, Calif.

[22] Filed: Dec. 30, 1971

[21] Appl. No.: 214,029

[52] U.S. Cl. ............. 74/99 R, 74/470, 74/519, 73/398 AR, 73/407 R
[51] Int. Cl. ............................................. F16h 21/02
[58] Field of Search ............... 74/479, 470, 519, 74/99 R; 73/407 R, 398 AR

[56] References Cited
UNITED STATES PATENTS
3,195,353    7/1965    Pien ........................ 73/398 AR
3,222,628   12/1965    Pien ........................ 73/398 AR Primary Examiner—Milton Kaufman
Attorney—Philip Subkow et al.

[57] ABSTRACT

A bell crank flexure useful in connection with a differential transducer whereby a differential force is translated through the bell crank flexure to a guided beam to permit the positioning of strain gauges to be oppositely stressed on the imposition of a differential force and transducers employing the same, for example, differential pressure gauges employing such flexures.

5 Claims, 5 Drawing Figures

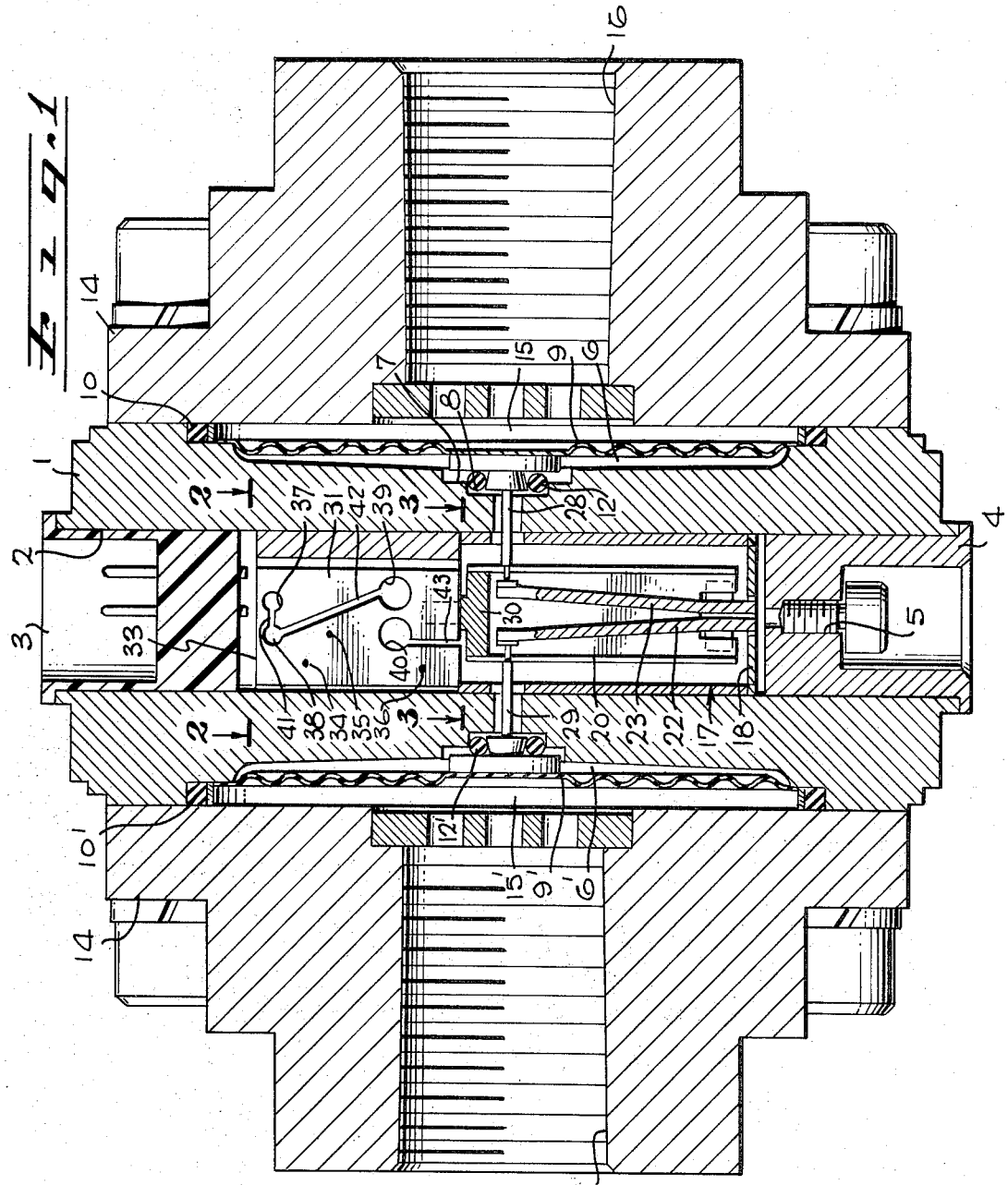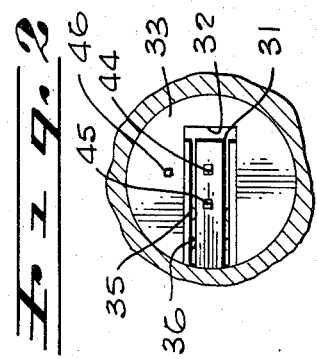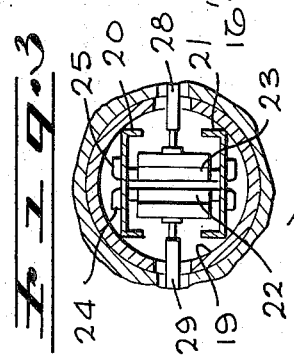

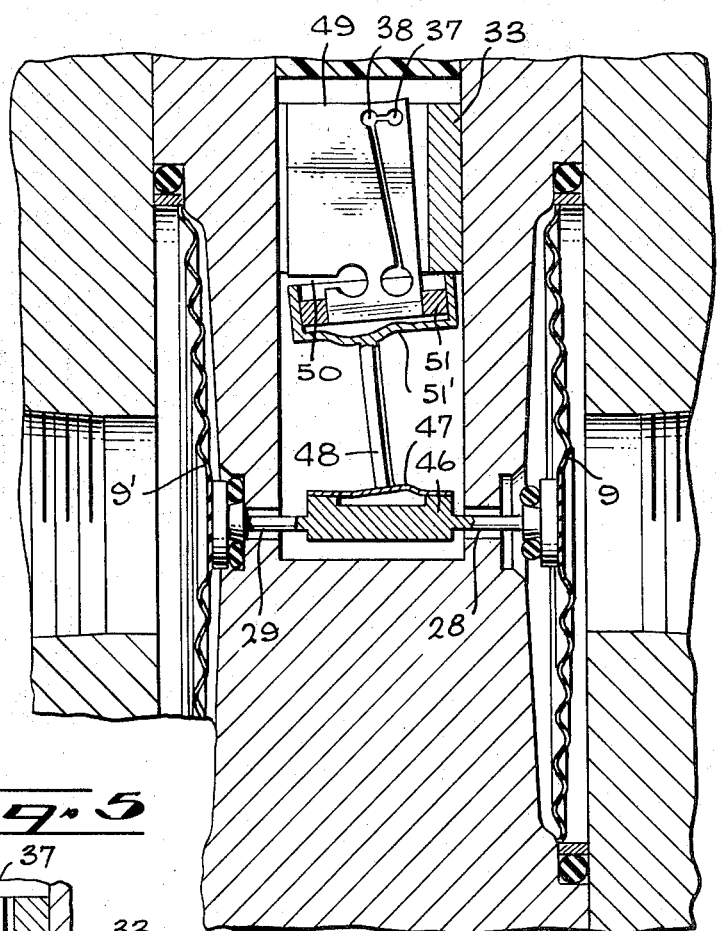
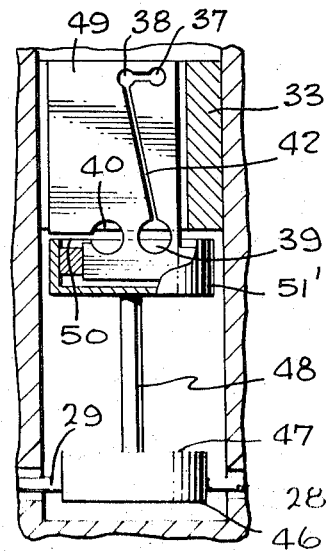
Richard R. Schaberg
Peter R. Perino
R. P. Helin
INVENTORS
Kendrick and Subkow
BY
ATTORNEYS

LOW RANGE HIGH OVERLOAD DIFFERENTIAL PRESSURE TRANSDUCER

This invention relates to a transducer which senses the difference between two conditions which may be small relative to the magnitude of the condition sensed; for example, the difference between two pressures which is very small relative to the magnitude of the pressure sensed. Thus the pressure may be a line pressure of high magnitude but the difference of pressure may be of very small magnitude.

The purpose of this invention is to withstand an overload without impairment of accuracy. In our preferred embodiment, the invention includes a differential pressure transducer in which diaphragms act as linear pressure-to-force transducers. The output force of the diaphragms is used to drive strain gauges that is a displacement-to-voltage converter through an intermediate linkage which is in the form of a bell crank flexure. At some high overload, i.e., at some pressure above full scale, the diaphragms are bottomed; and further transmission of force to the strain gauge linkage is prevented. Isolation is also provided so that the diaphragms form hermetic barriers between a noncorrosive internal medium and the external medium which may be corrosive.

FIG. 1 is a vertical section through a preferred embodiment of our invention.

FIG. 2 is a fragmentary section taken at 2—2 above the flexures in FIG. 1.

FIG. 3 is a fragmentary section in line 3—3 of FIG. 1.

FIG. 4 is a fragmentary vertical section of an alternative embodiment of the transducer of our invention shown schematically in its deflected positive parts being exaggerated for descriptive purposes.

FIG. 5 is a fragmentary sectional view of the transducer of FIG. 4 shown in the undeflected condition.

In FIG. 1, the cylindrical case 1 is bored with a cylindrical bore 2 which is closed by circular electrical terminals plug 3 for electrical connection and is enclosed by a plug 4 carrying a fill hole 5 through which a suitable quantity of oil may be introduced and which is closed by a suitable stud. A cylindrical cavity is thus provided in the case 1. The case 1 is cut out to form a diaphragm chamber 6 and 6', which are sealed by a convoluted diaphragm 9 and 9' and sealed at the edges of the diaphragm. Case 1 is further counterbored to receive the O-rings 12 and 12', and the diaphragm chambers 15 and 15' are closed by the cover plates 14 and mounted in the case by suitable studs and bored to receive inlet fitting at 16 and 16'.

Positioned within the bore 2 between the insulated terminal 3 and the plug 4 is the cylinder 17 closed by a bottom 18 carrying a central hole 19. Positioned on top of the cylinder 17 is a cylindrical frame 33 slotted at 32. Within the cylider 17 are positioned elongated leaf flexures 22 and 23 in the form of leaf springs having turned out tabs 24 and 25 connected at the bottom of the spaced angles 20 and 21 acting as a frame and extending through the hole 19. The connector 30 is mounted above the springs 22 and 23 and connects the angle 20 to 21.

The upper ends of the flexures 22 and 23 are connected to the force transmitting rods 28 and 29 acting as force collectors that pass between the angles 20 and 21 and through bores in the cylinder 17 and are connected to plates 11 and 11' mounted at the center of the diaphragms 9 and 9' in the bore 7 and counterbore 8 in which are positioned the O-rings 12 and 12'.

The flexure 31 in the form of a bar is bored at 37 and 38 adjacent its upper surface. The centers of the bores are on a common diameter parallel to the upper surface of the bar and with larger bores 39 and 40 positioned near the bottom of the flexure. The centers of the bores 38 and 37 are connected by a slot 41 passing through the common diameter parallel to the upper surface of the bar flexure 31. The bores 38 and 39 are connected by a slot 42 passing at an acute angle to the upper surface of the bar flexure 31 and the bores 38 and 37 are connected by slot 41 positioned in the aforesaid diameter parallel to the upper surface. The bore 40 is connected by a vertical slot 43 passing through the end of the bar flexure 31. While the FIG. 1 shows the slot 42 connected to 38, it may also be connected to 37 instead. The flexure 31 is spot welded in position inside the slot 32 at spot-weld position 34, 35, and 36, one on each side of the bar flexure to hold it rigidly at those points in the slot 32 leaving the remaining portions free to deflect. The top connector 30 is rigidly positioned in the bar flexure 31 between the bore 39 and 40.

The end of the bar flexure adjacent to bore 37 moves as a guided beam at its free end introducing a reverse bend with the netural zone in the region between the bore 38 and 37 and thus introducing a zone of tension at the surface of the bar on one side of the neutral zone and a zone of compression at the surface of the bar on the other side of the neutral zone. By placing bonded strain gauges; for example, vapor deposited film gauges, at both sides of the neutral zone as illustrated in FIG. 2, i.e., at 44, 45 and connecting them to terminal 46 position at the upper surface of the cylindrical plug 3, the strain gauges may be connected through the terminal 3 in the conventional manner; for example, in a Wheatstone bridge arrangement.

This is further illustrated in FIGS. 4, 5, and 6. Except for the elements appearing in FIG. 4 but not appearing in FIG. 1, the two systems are the same, the differences merely in the mechanism for force transmission from the diaphragms to the bar flexures and a variation in the position of the slots in the bar flexure. All of the parts which are the same bear like numbers. The bar flexure shown at 49 which is similar to the bar flexure 31 shown in FIG. 1 except that the slot 43 in FIG. 1 which extends perpendicularly to the lower edge of the flexure as shown in FIG. 1 is replaced by a slot extending parallel to the upper surface of 49 and is cut out as shown at 50. It is held in the ring fitting 51 which is connected to the diaphragm 51' which is centrally connected to the flexible rod 48. The force collector rods 29 and 28 are connected to the disc 46 relieved at the center across which is positioned the diaphragm 47 to which the rod 48 is centrally connected.

It will be seen that any differential displacement of the diaphragms 15 and 15' will introduce a lateral differential force which will be exerted to cause a displacement of the bell crank flexure.

Referring to FIG. 4, the displacement of the disc 46 to the right as shown in the figure introduces a bending moment in the area between the holes 40 and 39 and in the area of the bar flexure between the hole 38 and the right-hand edge of the bar flexure 49, resulting from an opening of the slot 50. The portion of the bar flexure to the right of the slot 42 moves vertically with respect to the portion of the bar flexure to the left of the slot 42 causing an upward movement of the upper right-hand corner of the bar flexure 49 with respect to the portion of the bar flexure 49 which is held rigidly in position in the slot 32 by virtue of the spot welds. The sections between the holes 40 and 39 and the hole 39 and the right-hand edge and the holes 37 and 38 are designed to permit bending in these regions and a resultant displacmeent of the upper right-hand corner which is but a fraction of the displacement of the diaphragm 15 or 15'. For example and as a limitation of our invention, the displacement of the upper right-hand corner of the bar flexure may be from about 10 to about 30 percent of the displacement of the force transmitting rods 28 or 29 at full scale and from about 2 to 10 percent of the movement of the force transmitting rods at overload conditions. Thus, for example, the upper corner of the bar flexure may be displaced 0.002 inches while the sensing diaphragms move 0.01 inches at full scale and 0.03 inches during overload conditions.

Referring now to the operation of FIG. 1, it will be seen that any differential displacement of the force collecting pins 29 and 28 will introduce a different displacement of the ends of the springs 22 and 23. This will cause the ends of these springs to move in the bore 19 either to the right or to the left. The angles 21 and 20 will be displaced to the right or left, introducing a right or left displacement in the portion of the bar flexure 31 where the connector 30 is connected to the bar flexure. This will cause the bar flexure to move to either open or close the slot 43 introducing a flexure at the surface of the bar flexure adjacent to the bore 37 and 38 in the manner described above.

Additional features illustrated in the FIGS. 1 and 4, if the differential force becomes large enough to seat the diaphragm against the surface 8 or 8' at the O-rings, any further increase in pressure will not cause any further displacement of the flexure or diaphragm and the instrument is preserved against damaging overload.

Further, when the ends of the springs 22 or 23 in FIG. 1 come against an edge of the slot 19, further displacement of the angles is prevented. This also limits the displacement of the free end of the bar flexure and limits the degree of flexure at the surface of the bar flange in the region of the holes 37 and 38 where the strain gauges are positioned.

The organization of the flexure so that the differential force may be exerted through a flexure to cause a guided beam displacement of a surface positioned parallel in the direction of the differential force permits of miniaturization of the transducer.

We claim:

1. A transducer, including a force collector, a bell crank flexure connected to said force collector, said bell crank flexure comprising an elongated flexure means extending transversely to said force collectors and connected at one end of said elongated flexure means to said force collectors, a bar flexure operatively connected to the end of said elongated flexure means opposite to the point of connection of said elongated flexure means to the force collectors, said bar flexure comprising a pair of bores through said bar flexure and positioned in said bar flexure adjacent the end of the bar flexure opposite the point of connection of the elongated flexure means to said bar flexure, a pair of spaced bores through said bar flexure positioned adjacent the end of said bar flexure opposite the said first mentioned pair of bores, a slot extending from one of said second mentioned pair of bores and passing through one edge of said bar flexure, a slot extending from the other of said second mentioned bores to one of said first mentioned bores, a frame, means to fix said bar flexure in said frame at one side of said slots whereby on the differential movement of said force collectors a force is transmitted to said bar flexure and whereby the upper portion of said bar flexure adjacent the first mentioned bore moves as a guided beam to introduce reverse curvature passing through a neutral zone between said first mentioned bores.

2. The bell crank flexure of claim 1 in which said elongated flexure means comprises a pair of leaf springs, one each of said leaf springs connected to one each of said force collectors adjacent end of said leaf springs adjacent one end of each of said leaf springs, a second frame, each of said leaf springs connected to second frame adjacent the ends of said leaf springs opposite to the first mentioned end of said leaf springs, said frame connected to said bar flexure adjacent said lower bores.

3. The bell crank flexure means of claim 1 in which said elongated flexure means comprises a rod, and a pair of flexible diaphragms, one of said flexible diaphragms connected to one end of said bar flexure means and the other end of said bar flexure means connected to the second diaphragm.

4. A differential pressure transducer comprising a pair of diaphragm chambers, pressure inlets to each of said diaphragm chambers, each diaphragm closing a diaphragm chamber, each of said diaphragms connected through a force collector to a bell crank flexure means, said bell crank flexure comprising an elongated flexure means extending transversely to said force collectors and connected at one end of said elongated flexure means to said force collectors, a bar flexure operatively connected to the end of said elongated flexure opposite to the point of connection of said elongated flexure means to the force collectors, said bar flexure comprising a pair of bores through said bar flexure and positioned in said bar flexure adjacent the end of the bar flexure opposite the point of connection of the elongated flexure means to said bar flexure, a pair of spaced bores through said bar flexure positioned adjacent the end of said bar flexure opposite the said first mentioned pair of bores, a slot extending from one of said second mentioned pair of bores and passing through one edge of said bar flexure, a slot extending from the other of said second mentioned bores to one of said first mentioned bores, a frame, means to fix said bar flexure in said frame at one side of said slots whereby on the differential movement of said force collectors a force is transmitted to said bar flexure and whereby the upper portion of said bar flexure adjacent the first mentioned bore moves as a guided beam to introduce reverse curvature passing through a neutral zone between said first mentioned bores.

5. The bell crank flexure of claim 1 in which said elongated flexure means comprises a pair of leaf springs, one each of said leaf springs connected to one each of said force collectors adjacent end of said leaf springs adjacent one end of each of said leaf springs, a second frame, each of said leaf springs connected to second frame adjacent the ends of said leaf springs opposite to the first mentioned end of said leaf springs, said frame connected to said bar flexure adjacent said lower bores.

* * * * *